Aug. 19, 1969  J. G. CADIOU  3,461,530
METHOD OF MANUFACTURE OF TANKS FOR FLUIDS UNDER PRESSURE
Filed Jan. 4, 1967  2 Sheets-Sheet 1

Jean Georges Cadiou,
Inventor
By, Wenderoth, Lind & Ponack,
Attorneys

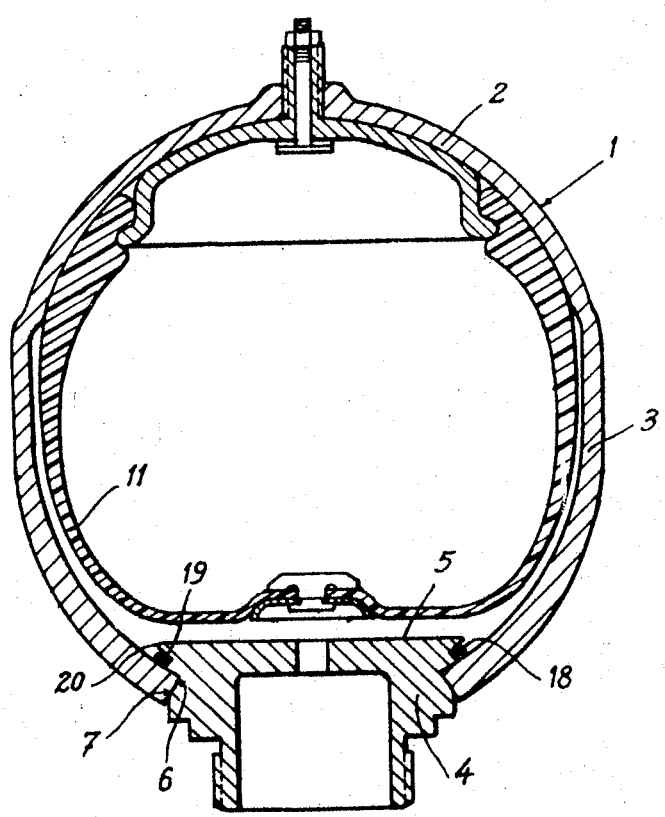

United States Patent Office 3,461,530
Patented Aug. 19, 1969

3,461,530
METHOD OF MANUFACTURE OF TANKS FOR FLUIDS UNDER PRESSURE
Jean Georges Cadiou, Paris, France, assignor to Societe Anonyme Andre Citroen, Paris, France
Filed Jan. 4, 1967, Ser. No. 607,191
Claims priority, application France, Jan. 13, 1966, 45,814; July 4, 1966, 68,060
Int. Cl. B21d 53/00; B21k 29/00
U.S. Cl. 29—157                                                5 Claims

ABSTRACT OF THE DISCLOSURE

A tank and method of manufacturing for fluid under pressure of the accumulator type with an internal deformable partition to form a gas filled chamber and a fluid pressure chamber. A disc of sheet metal is deformed in the cold in two stages comprising a first stage of stamping said disc to form a blank with a cylindrical portion and a domed bottom having a small orifice at one extremity in which the partition is secured and open at the other extremity. A second stage constricts the cylindrical portion of the blank to a spherical shape until an axial orifice of minimum diameter is obtained. An end closure member is secured in said axial orifice by said constricting of the cylindrical portion.

---

Figure 1:
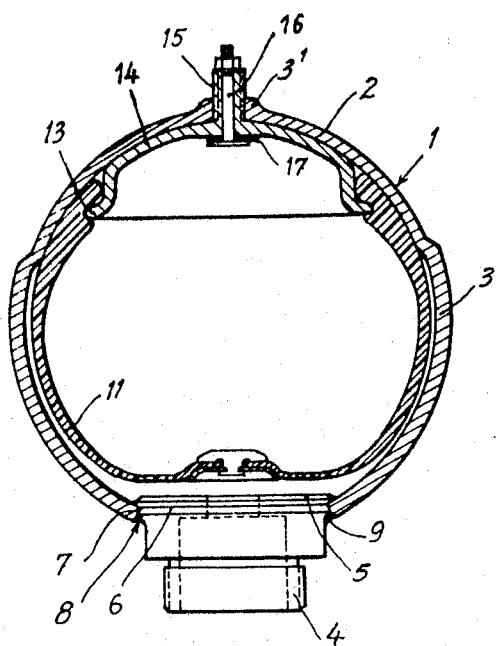

The present invention relates to improvements in tanks for fluids under pressure, and more particularly to accumulators for fluids under pressure, and has especially for its object a method of manufacture of these tanks and accumulators.

An accumulator for fluid under pressure is constituted
(1) By a tank capable of withstanding the forces due to the pressure of the fluid or fluids contained in the said tank;
(2) By a deformable internal partition dividing the inner space of the tank into two chambers. One of the chambers is filled by a definite mass of gas and the other chamber receives the liquid to be accumulated under pressure, the intake of the said liquid resulting in deformation of the internal partition and the consequential compression of the gas;
(3) By a device for filling the chamber intended to receive the gas;
(4) By a coupling device to the hydraulic circuit of the chamber intended to receive the liquid.

The present invention has for its object to provide an economic method of construction of accumulators of this kind by providing:
(a) A casing in a single piece produced by cold deformation of a sheet metal disc, this deformation being produced in two stages. In a first stage, a cylindrical blank is made having one extremity closed by a bottom, the other extremity remaining open. The piece thus obtained will be known as a "blank." In a second stage, the cylindrical portion of the blank is deformed in order to reduce the diameter of the open extremity of the said blank until an axial orifice of minimum diameter is obtained. This operation will be known as "constriction" in the text which follows. It may be preceded by a levelling of the edge of the cylinder, which may not be flat after the first operation;
(b) The placing in position of all or part of the internal elements of the accumulator, such as the separator and its fixing means, before carrying out the operation of constriction, the separator may be held against the bottom of the blank by means of an air depression applied through the fixing orifice of the separator.

It will be understood that the particular features defined above are not applied solely to accumulators which comprise a tank made of sheet steel; the invention is applicable to all tanks, the construction of which comprises the production of a blank followed by a constriction operation, the terms "blank" and "constriction" having the meaning specified above.

(c) The reinforcement of the filling orifice in the wall of the sheet steel tank, by creating an additional thickness adjacent to the said orifice by displacement of the metal contained in the geometric stress defined by the limits of the orifice to be obtained;

(d) The closure of the axial orifice obtained during the operation of constriction in two stages; the closure element may be, for example, the coupling element for the oil circuit.

In a first stage, an operation such as insetting is carried out. During the constriction operation, the diameter of the open end without a bottom of the blank is reduced in diameter; in such manner that the periphery of the final orifice is engaged in a groove located on the periphery of the closure member of the said orifice. In this way, there is effected a rigid fixing of the closure member on the tank.

At a second stage, this fixation is consolidated by an operation such as welding. It is interesting to note that this method makes it possible to avoid any machining after the diaphragm is placed in position, and in consequence all danger of introduction of metal swarf, difficult to eliminate when the apparatus is finished, is obviated.

Figure 2:
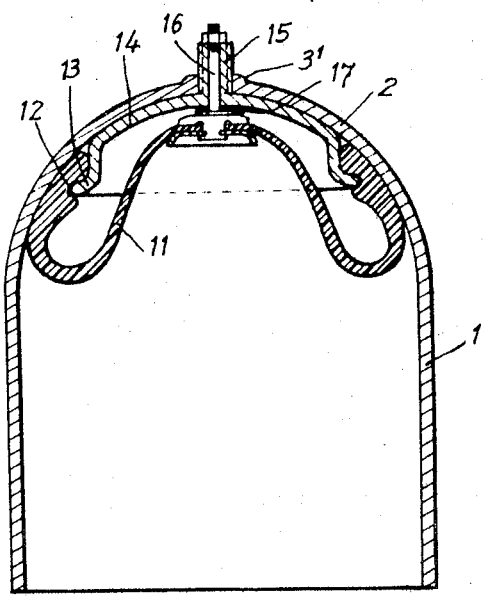

In the accompanying drawings:
FIG. 1 shows one form of construction of an accumulator in accordance with the invention, given by way of example;
FIG. 2 shows the accumulator in the form of a blank and the placing in position of the separator;
FIG. 3 shows an alternative form of construction.

The starting material comprises a sheet steel disc deformed while cold at a first stage so as to form a cylindrical blank 1 closed at one extremity by a domed end 2, as is clearly shown in FIG. 2. In the domed end is provided an axial orifice $3^1$ in the immediate vicinity of which is provided an additional thickness obtained by cold upsetting of the metal contained in the geometrical space of the orifice to be made. At a second stage, there is carried out the operation of constriction of the open part of the blank.

The central region 1 of the cylindrical or conical blank is coupled on the one hand to the bottom 2 described above and on the other to a zone 3 which is preferably spherical. The closure member 4 comprises a circular collar 5, the periphery of which is in contact with the internal wall of the tank. A groove 6 adjacent to the collar is provided so as to permit engagement for insetting the periphery 7 of the orifice of the tank in the said groove. The dimensions of this groove are so chosen that the walls of the orifice only come into contact with the closure member over a fraction of the thickness of the local wall of the tank, as can be seen from FIG. 1. The fraction of this thickness which remains visible forms, with the lateral surface of the closure member, a groove 8 which advantageously facilitates the welding operation (the welding bead 9) which follows the insetting operation.

FIG. 2 shows by way of example the assembly of the separator 11 in the preliminary blank 1-2. This separator, in the form of a flexible diaphragm 11 in the construction shown by way of example, is provided at its periphery with a groove 12, in which is engaged the bent-back edge 13 of a cap 14 supported against the extremity 2 of the blank, and having a central tubular portion 15 passing through the orifice $3^1$ of the blank, and serving to fix the cap 14 in position. A clapper valve 16 passing through the pipe 15 and supported against the inner surface of the cap 14, with the interposition of a sealing joint 17, can be locked in the closed position, for example by means of a nut.

It should be noted that the separator may be held against the bottom of the blank during assembly by a depression applied through the fixing orifice of the separator.

It will be observed that the accumulator according to the invention permits the use of a flexible separator and a fixing device which it would be impossible to place in position once the casing has been given its final shape.

In an alternative form of construction shown in FIG. 3, there is provided a different method of fixing of the intake end-piece or member for the liquid on the body or casing of the tank. The end-piece is inset in the casing without welding, fluid-tightness of the liquid compartment with respect to the exterior being obtained by a toric joint between the casing of the tank and a shoulder provided on the end piece.

Referring now to FIG. 3, it can be seen that the body or casing 1 of the tank comprises the extremity 2 and the spherical portion 3 which is coupled to the end-piece or member 4 which serves as the intake of the liquid, for example. The body or casing of the tank is again produced by the method utilizing two stages, formation of a cylindrical or conical blank with a bottom in the first stage, and an operation of constriction in order to deform the open portion of the blank until an axial orifice is obtained for coupling to the end-piece, in a second stage. The tank also comprises the deformable partition 11.

The coupling between the casing 3 of the tank and the end-piece 4 is effected by a toric joint 18 of rubber or plastic material for example, which is placed in a groove 19 formed in the collar 5 between a shoulder 20 of the said collar and the inner wall of the tank.

This joint is compressed during the insetting of the periphery 7 of the opening of the casing, in the end-piece.

At the same time as obtaining good fluid-tightness, this arrangement permits the operation of welding of the end-piece on the periphery of the opening of the casing to be dispensed with, which reduces the production cost and produces a tank or accumulator with a satisfactory resistance to fatigue in the case of pulsatory pressures.

What is claimed is:

1. A method of manufacturing a tank for fluid under pressure of the accumulator type with an internal deformable partition to form a gas filled chamber and a fluid pressure chamber, comprising deforming in the cold a disc of sheet metal in two stages comprising a first stage of stamping said disc to form a blank with a cylindrical portion and a domed bottom having a small orifice at one extremity in which said partition is secured and open at the other extremity, and a second stage constricting said cylindrical portion of said blank to a spherical shape until an axial orifice of minimum diameter is obtained and then coupling an end closure member in said axial orifice by said constricting of said cylindrical portion.

2. A method in accordance with claim 1 comprising upsetting the metal of said blank to provide an additional thickness of peripheral metal adjacent said axial orifice.

3. A method in accordance with claim 1, comprising placing said internal deformable partition and fixing it in position before said constricting of said blank.

4. A method in accordance with claim 1, wherein said closure member of said axial orifice is rigidly fixed on said tank by welding after setting.

5. A method in accordance with claim 1, wherein the coupling of said closure member is executed by the arrangement during said constricting stage of a toric joint between a shoulder of a collar of said closure member and the internal wall of the tank in the vicinity of the periphery of said axial orifice.

References Cited

UNITED STATES PATENTS

| 2,030,818 | 2/1936 | Harter. | |
| 2,136,007 | 11/1938 | Gish | 113—120 X |
| 2,931,392 | 4/1960 | Mercier | 138—30 |
| 3,211,184 | 10/1965 | Greer | 138—30 |

FOREIGN PATENTS

| 376,957 | 7/1932 | Great Britain. |
| 980,009 | 5/1951 | France. |

PAUL M. COHEN, Primary Examiner

U.S. Cl. X.R.

29—157.4; 113—120; 138—30